United States Patent
Shimanaka et al.

(10) Patent No.: US 12,237,097 B2
(45) Date of Patent: Feb. 25, 2025

(54) CARBON MATERIAL DISPERSION

(71) Applicant: DAINICHISEIKA COLOR & CHEMICALS MFG. CO., LTD., Tokyo (JP)

(72) Inventors: Hiroyuki Shimanaka, Tokyo (JP); Yoshikazu Murakami, Tokyo (JP); Jun Kamabayashi, Tokyo (JP); Seiji Doi, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 172 days.

(21) Appl. No.: 17/999,767

(22) PCT Filed: Jul. 2, 2021

(86) PCT No.: PCT/JP2021/025187
§ 371 (c)(1),
(2) Date: Nov. 23, 2022

(87) PCT Pub. No.: WO2022/009805
PCT Pub. Date: Jan. 13, 2022

(65) Prior Publication Data
US 2023/0212343 A1 Jul. 6, 2023

(30) Foreign Application Priority Data
Jul. 9, 2020 (JP) .................. 2020-118584

(51) Int. Cl.
| | | |
|---|---|---|
| H01B 1/24 | (2006.01) | |
| C01B 32/174 | (2017.01) | |
| C01B 32/194 | (2017.01) | |
| C08F 290/14 | (2006.01) | |
| C08K 7/06 | (2006.01) | |
| C09C 1/56 | (2006.01) | |
| C09D 11/037 | (2014.01) | |
| C09D 11/52 | (2014.01) | |
| C09K 23/46 | (2022.01) | |
| H01B 1/12 | (2006.01) | |

(52) U.S. Cl.
CPC ............ H01B 1/24 (2013.01); C01B 32/174 (2017.08); C01B 32/194 (2017.08); C08F 290/142 (2013.01); C08K 7/06 (2013.01); C09C 1/56 (2013.01); C09D 11/037 (2013.01); C09D 11/52 (2013.01); C09K 23/46 (2022.01); H01B 1/12 (2013.01); C01B 2202/22 (2013.01); C01B 2202/28 (2013.01); C01B 2204/22 (2013.01); C01B 2204/28 (2013.01); C01P 2006/22 (2013.01); C01P 2006/40 (2013.01); C08K 2201/001 (2013.01)

(58) Field of Classification Search
None
See application file for complete search history.

(56) References Cited

U.S. PATENT DOCUMENTS

| | | |
|---|---|---|
| 2010/0120974 A1 | 5/2010 | Shimanaka et al. |
| 2010/0122642 A1 | 5/2010 | Farrugia et al. |
| 2012/0160128 A1 | 6/2012 | Kobayashi et al. |

(Continued)

FOREIGN PATENT DOCUMENTS

| | | |
|---|---|---|
| JP | 2008-248412 | 10/2008 |
| JP | 2008-280450 | 11/2008 |
| JP | 2009-196853 | 9/2009 |

(Continued)

OTHER PUBLICATIONS

International Search Report, issued in the corresponding PCT application No. PCT/JP2021/025187 dated Aug. 24, 2021, 7 pages (including machine translation).

(Continued)

Primary Examiner — Katie L. Hammer
(74) Attorney, Agent, or Firm — HSML P.C.

(57) ABSTRACT

The present invention provides a carbon material dispersion in which a carbon material is contained at a high concentration in a liquid medium containing an organic solvent but is unlikely to reaggregate and is stably dispersed, and from which various products, such as an ink capable of forming a coating film having excellent electric conductivity, can be formed. This carbon material dispersion contains a carbon material, an organic solvent, and a polymeric dispersant, wherein the polymeric dispersant is a polymer having 3 to 55% by mass of a constituent unit (1) represented by the following formula (1), wherein R represents a hydrogen atom or the like, A represents O or NH, B represents an ethylene group or the like, $R_1$ and $R_2$ each independently represent a methyl group or the like, Ar represents a phenyl group or the like, X represents a chlorine atom or the like, and p represents an arbitrary number of repeating units, and the polymeric dispersant has an amine value of 100 mgKOH/g or less and a number average molecular weight of 5,000 to 20,000.

(1)

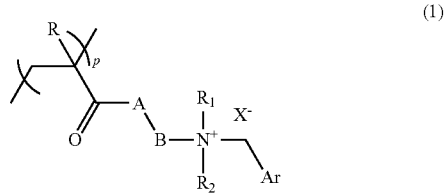

5 Claims, No Drawings

(56) References Cited

U.S. PATENT DOCUMENTS

2016/0340521 A1   11/2016   Yoshiwara et al.

FOREIGN PATENT DOCUMENTS

| | | |
|---|---|---|
| JP | 2010-037537 | 2/2010 |
| JP | 2010-132901 | 6/2010 |
| JP | 2010-173886 | 8/2010 |
| JP | 2010-174084 | 8/2010 |
| JP | 2012-21100 | 2/2012 |
| JP | 2013-075795 | 4/2013 |
| JP | 2013-537570 | 10/2013 |
| KR | 10-1138558 | 5/2012 |
| WO | 2011/024800 | 3/2011 |
| WO | 2015-115102 | 8/2015 |

OTHER PUBLICATIONS

Korean Office Action, issued in the corresponding Korean patent application No. 10-2023-7000720, dated Dec. 9, 2024, 10 pages with the machine translation.

CARBON MATERIAL DISPERSION

TECHNICAL FIELD

The present invention relates to carbon material dispersion.

BACKGROUND ART

Carbon materials such as carbon black, a carbon fiber, a carbon nanotube, graphene, graphite (or also referred to as "nanocarbon materials") have a six-membered cyclic graphite structure formed by covalent bonds of carbon atoms. Since these carbon materials are materials exhibiting properties such as electric conductivity and heat transfer properties, use methods that utilize these properties are being studied in a wide range of fields. For example, taking notice of the electrical characteristics, thermal characteristics, characteristics as fillers, and the like of carbon materials, use methods as an antistatic agent, an electrically conductive material, and a plastic reinforcing material have been proposed so far. Further, development is underway as a material for forming semiconductors, fuel cell electrodes, cathode rays on displays, and the like.

For these applications, a carbon material is usually used in a state of a carbon material dispersion in which the carbon material is dispersed in a liquid medium such as an organic solvent. Then, for such a carbon material dispersion, it is required that the carbon material be excellent in so-called dispersibility such that the carbon material is uniformly and stably dispersed in the liquid medium. Further, it is also required that such dispersibility is stably maintained over a long period of time. However, a nano-sized carbon material has a characteristic that it is easy to aggregate because it has high surface energy and strong van der Waals force acts thereon. Accordingly, the nano-sized carbon material has a problem that even if it is dispersed, it quickly aggregates.

In order to solve such problems and to stably disperse a carbon material in a liquid medium, a dispersant is used in some cases. For example, it has been proposed to disperse a carbon material such as a carbon nanotube in a liquid medium using a cationic surfactant such as an alkanolamine salt or a polymeric dispersant such as a styrene-acrylic resin as a dispersant (Patent Literatures 1 and 2).

CITATION LIST

Patent Literature

Patent Literature 1: Japanese Patent Laid-Open No. 2010-174084
Patent Literature 2: Japanese Translation of PCT International Application Publication No. 2013-537570

SUMMARY OF INVENTION

Technical Problem

By using the dispersant proposed in Patent Documents 1 and 2, it was possible to disperse the carbon material in the liquid medium to some extent. However, the dispersibility is insufficient, or the carbon material easily reaggregates after being dispersed, and therefore it cannot be said that the dispersion performance is necessarily sufficient and there is room for further improvement.

The present invention has been completed in view of such problems of the conventional techniques, and an object of the present invention is to provide a carbon material dispersion in which a carbon material is contained at a high concentration in a liquid medium containing an organic solvent but is unlikely to reaggregate and is stably dispersed, and from which various products, such as an ink capable of forming a coating film having excellent electric conductivity, can be formed.

Solution to Problem

That is, according to the present invention, a carbon material dispersion described below is provided.

[1] A carbon material dispersion comprising at least one carbon material selected from the group consisting of carbon black, a carbon fiber, a carbon nanotube, graphite, and graphene; an organic solvent; and a polymeric dispersant, wherein the polymeric dispersant is a polymer having 3 to 55% by mass of a constituent unit (1) represented by the following formula (1), 45 to 90% by mass of a constituent unit (3) represented by the following formula (3), and 0.5 to 20% by mass of an additional constituent unit (4) connecting the constituent unit (1) and the constituent unit (3), provided that the total amount of all the constituent units is assumed to be 100% by mass, and the polymeric dispersant has an amine value of 100 mgKOH/g or less and a number average molecular weight of 5,000 to 20,000.

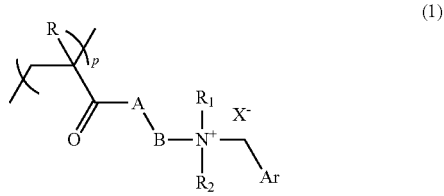

(1)

wherein R represents a hydrogen atom or a methyl group, A represents O or NH, B represents an ethylene group or a propylene group, $R_1$ and $R_2$ each independently represent a methyl group or an ethyl group, Ar represents a phenyl group, a naphthyl group, an anthracenyl group, or a pyrenyl group, X represents a chlorine atom, a bromine atom, bis(trifluoromethyl)sulfonimide, or bis(nonafluorobutane-sulfonyl)imide, and p represents an arbitrary number of repetition.

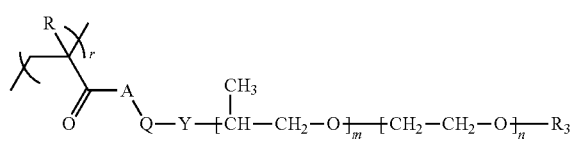

(3)

wherein R represents a hydrogen atom or a methyl group, A represents O or NH, Q represents an ethylene group or a methylethylene group, Y represents O, NHCOO, or NHCONH, m and n each independently represent an average number of repeating units of 0 or more and satisfy m+n=20 to 100, $R_3$ represents a C1-18 alkyl group, aryl group, or alkylaryl group, and r represents an arbitrary number of repetition.

[2] The carbon material dispersion according to [1], wherein the polymeric dispersant is the polymer further having a constituent unit (2) represented by the following formula (2).

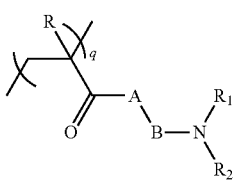

(2)

wherein R represents a hydrogen atom or a methyl group, A represents O or NH, B represents an ethylene group or a propylene group, $R_1$ and $R_2$ each independently represent a methyl group or an ethyl group, and q represents an arbitrary number of repetition.

[3] The carbon material dispersion according to [2], wherein the constituent unit (1), the constituent unit (2), and the constituent unit (3) are represented by the following formula (1-1), the following formula (2-1), and the following formula (3-1), respectively, and the constituent unit (4) comprises a constituent unit derived from α-methylstyrene.

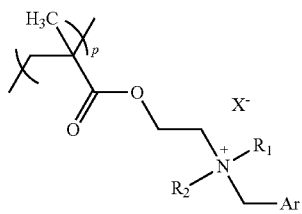

(1-1)

wherein $R_1$ and $R_2$ each independently represent a methyl group or an ethyl group, Ar represents a phenyl group, a naphthyl group, an anthracenyl group, or a pyrenyl group, X represents a chlorine atom, a bromine atom, bis(trifluoromethyl)sulfonimide, or bis(nonafluorobutanesulfonyl)imide, and p represents an arbitrary number of repetition.

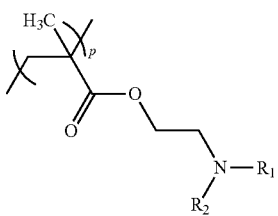

(2-1)

wherein $R_1$ and $R_2$ each independently represent a methyl group or an ethyl group, and q represents an arbitrary number of repetition.

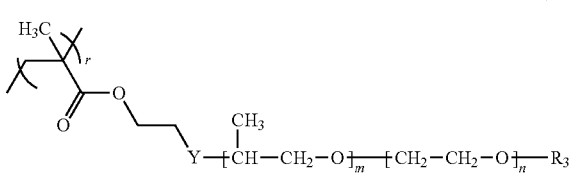

(3-1)

wherein Y represents NHCOO or NHCONH, m and n each independently represent an average number of repeating units of 0 or more and satisfy m+n=20 to 100, $R_3$ represents a C1-18 alkyl group, aryl group, or alkylaryl group, and r represents an arbitrary number of repetition.

[4] The carbon material dispersion according to any one of [1] to [3], wherein a content of the carbon material is 15% by mass or less, and a content of the polymeric dispersant based on 100 parts by mass of the carbon material is 10 to 200 parts by mass.

Advantageous Effects of Invention

The present invention can provide a carbon material dispersion in which a carbon material is contained in at high concentration in a liquid medium containing an organic solvent but is unlikely to reaggregate and is stably dispersed, and from which various products, such as an ink capable of forming a coating film having excellent electric conductivity, can be formed.

DESCRIPTION OF EMBODIMENTS

<Carbon Material Dispersion>

Hereinafter, embodiments of the present invention will be described, but the present invention is not limited to the following embodiments. A carbon material dispersion of the present invention contains a carbon material, an organic solvent, and a polymeric dispersant. The polymeric dispersant that disperses the carbon material in a liquid medium containing the organic solvent is a polymer having a constituent unit (1) represented by the following formula (1), a constituent unit (3) represented by the following formula (3), and an additional constituent unit (4) connecting the constituent unit (1) and the constituent unit (3). Then, this polymeric dispersant has an amine value of 100 mgKOH/g or less and a number average molecular weight (Mn) of 5,000 to 20,000. Hereinafter, the details on the carbon material dispersion of the present invention will be described.

(Carbon Material)

The carbon material is at least one selected from the group consisting of carbon black, a carbon fiber, a carbon nanotube, graphite, and graphene. As the carbon black, conventionally known various kinds of carbon black, such as acetylene black, furnace black, acetylene black, thermal black, and Ketjen black, can be used.

Examples of the carbon fiber include a PAN-based carbon fiber using polyacrylonitrile as a raw material, a pitch-based carbon fiber using pitch as a raw material, and recycled products thereof. Among these, the carbon fiber is preferably a so-called carbon nanofiber having a nano-sized fiber diameter and having a cylindrical shape obtained by winding six-membered cyclic graphite structure or a carbon nanotube having a single nano-sized fiber diameter. Each of the carbon nanofiber and the carbon nanotube may be multi-layered (multi-walled) one or single-layered (single-walled) one.

A metal, such as platinum or palladium, or a metal salt may be doped in the carbon material. Further, the carbon material may be surface-modified by an oxidation treatment, a plasma treatment, a radiation treatment, a corona treatment, a coupling treatment, or the like.

(Organic Solvent)

As the organic solvent, a conventionally known organic solvent can be used. Note that water can also be used together with the organic solvent. Examples of the solvent include hydrocarbon-based solvents such as hexane, toluene, and xylene; alcohol-based solvents such as methanol, ethanol, isopropanol, butanol, and dodecanol; ketone-based solvents such as acetone, methyl ethyl ketone, diethyl ketone, and isobutyl methyl ketone; ester-based solvents such as ethyl acetate, butyl acetate, amyl acetate, dimethyl succinate, dimethyl adipate, methyl lactate, and dimethyl lactate; ether-based solvents such as dipropyl ether, tetrahydrofuran, and dioxane; carbonate-based solvents such as dimethyl carbonate, ethylene carbonate, and propylene carbonate; amide-based solvents such as N,N-dimethylformamide, N,N-dimethylacetamide, pyrrolidone, N-methylpyrrolidone, 3-methoxy-N,N-dimethylpropanamide, and 3-butoxy-N,N-dimethylpropanamide; urea-based solvents such as tetramethylurea and dimethyl imidazolidinone; sulfoxide-based solvents such as dimethyl sulfoxide; glycol monoether-based solvents such as ethylene glycol, propylene glycol, diethylene glycol, ethylene glycol methyl ether, ethylene glycol butyl ether, diethylene glycol methyl ether, diethylene glycol monobutyl ether, triethylene glycol monobutyl ether, propylene glycol monomethyl ether, propylene glycol monopropyl ether, propylene glycol monobutyl ether, and dipropylene glycol monomethyl ether; glycol diether-based solvents such as ethylene glycol dimethyl ether, diethylene glycol dimethyl ether, diethylene glycol diethyl ether, and dipropylene glycol dimethyl ether; and glycol ether monoether ester-based solvents such as ethylene glycol monomethyl ether acetate, diethylene glycol monomethyl ether acetate, propylene glycol monomethyl ether acetate, and propylene glycol monobutyl ether acetate.

In addition, a reactive monomer, such as a (meth)acrylic monomer, a vinyl ether-based monomer, an epoxy compound, or an oxetane compound, can be used as the organic solvent. By using such a reactive monomer as the organic solvent, a carbon material dispersion with which an ultraviolet ray/electron beam curable ink, an ultraviolet ray/electron beam curable coating agent, and the like can be prepared can be made.

(Polymeric Dispersant)

The polymeric dispersant is a polymer having 3 to 55% by mass of a constituent unit (1) represented by formula (1), 45 to 90% by mass of a constituent unit (3) represented by formula (3), and 0.5 to 20% by mass of an additional constituent unit (4) connecting the constituent unit (1) and the constituent unit (3), provided that the total amount of all the constituent units is assumed to be 100% by mass.

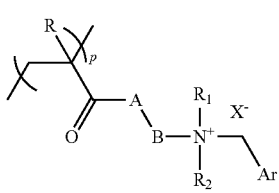

(1)

wherein R represents a hydrogen atom or a methyl group, A represents O or NH, B represents an ethylene group or a propylene group, $R_1$ and $R_2$ each independently represent a methyl group or an ethyl group, Ar represents a phenyl group, a naphthyl group, an anthracenyl group, or a pyrenyl group, X represents a chlorine atom, a bromine atom, bis(trifluoromethyl)sulfonimide, or bis(nonafluorobutane-sulfonyl)imide, and p represents an arbitrary number of repetition.

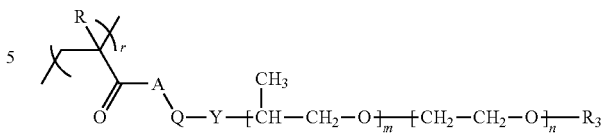

(3)

wherein R represents a hydrogen atom or a methyl group, A represents O or NH, Q represents an ethylene group or a methylethylene group, Y represents O, NHCOO, or NHCONH, m and n each independently represent an average number of repeating units of 0 or more and satisfy m+n=20 to 100, $R_3$ represents a C1-18 alkyl group, aryl group, or alkylaryl group, and r represents an arbitrary number of repetition.

[Constituent Unit (1)]

The constituent unit (1) is a constituent unit having a quaternary ammonium salt group. Examples of a monomer (monomer 1) capable of forming the constituent unit (1) include a monomer represented by the following formula (1a). Adsorption of the quaternary ammonium salt group in the constituent unit (1) to the carbon material is considered to contribute to an improvement in dispersibility of the carbon material into the liquid medium containing the organic solvent. In addition, an aryl methyl group ($-CH_2-$Ar) is one of the substituents bonding to a nitrogen atom of the quaternary ammonium salt group. Affinity of an aromatic ring in this aryl methyl group to the carbon material is considered to improve the dispersibility of the carbon material. When the carbon numbers of $R_1$ and $R_2$ in formula (1) are too large, the aryl methyl group is destabilized and the quaternary ammonium salt group is unlikely to be formed due to steric hindrance. Therefore, $R_1$ and $R_2$ in formula (1) needs to be each independently a methyl group or an ethyl group.

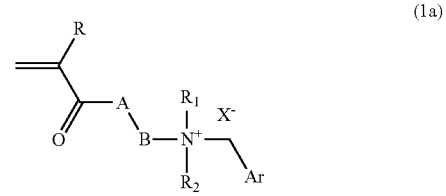

(1a)

wherein R represents a hydrogen atom or a methyl group, A represents O or NH, B represents an ethylene group or a propylene group, $R_1$ and $R_2$ each independently represent a methyl group or an ethyl group, Ar represents a phenyl group, a naphthyl group, an anthracenyl group, or a pyrenyl group, and X represents a chlorine atom, a bromine atom, bis(trifluoromethyl)sulfonimide, or bis(nonafluorobutane-sulfonyl)imide.

The quaternary ammonium salt group is an ionic functional group, and therefore the polymer (polymeric dispersant) having the constituent unit (1) having this quaternary ammonium salt group is expected to exhibit electric conductivity due to water adsorption or ionic conductivity. That is, by using the polymer having the constituent unit (1) as the polymeric dispersant, it is expected to make a carbon material dispersion capable of forming a coating film in which lowering of the electric conductivity is suppressed.

The constituent unit (1) is preferably represented by the following formula (1-1).

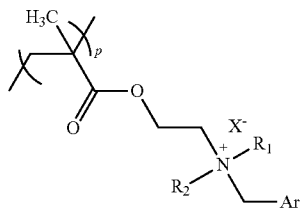

(1-1)

wherein $R_1$ and $R_2$ each independently represent a methyl group or an ethyl group, Ar represents a phenyl group, a naphthyl group, an anthracenyl group, or a pyrenyl group, X represents a chlorine atom, a bromine atom, bis(trifluoromethyl)sulfonimide, or bis(nonafluorobutanesulfonyl)imide, and p represents an arbitrary number of repetition.

The constituent unit represented by formula (1-1) is formed from, for example, a monomer represented by the following formula (1a-1).

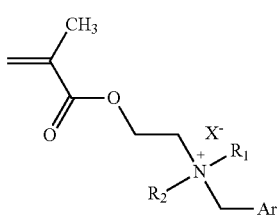

(1a-1)

wherein $R_1$ and $R_2$ each independently represent a methyl group or an ethyl group, Ar represents a phenyl group, a naphthyl group, an anthracenyl group, or a pyrenyl group, and X represents a chlorine atom, a bromine atom, bis(trifluoromethyl)sulfonimide, or bis(nonafluorobutanesulfonyl)imide.

Specific examples of the monomer capable of forming the constituent unit represented by formula (1-1) include dimethylnaphthylmethylammoniumethyl methacrylate chloride, dimethylnaphthylmethylammoniumethyl methacrylate bromide, dimethylnaphthylmethylammoniumethyl methacrylate bis(trifluoromethyl)sulfonimide, dimethylnaphthylmethylammoniumethyl methacrylate bis(nonafluorobutanesulfonyl)imide, diethylnaphthylmethylammoniumethyl methacrylate chloride, diethylnaphthylmethylammoniumethyl methacrylate bromide, diethylnaphthylmethylammoniumethyl methacrylate bis(trifluoromethyl)sulfonimide, diethylnaphthylmethylammoniumethyl methacrylate bis(nonafluorobutanesulfonyl)imide, anthracenylmethyldimethylmethylammoniumethyl methacrylate chloride, anthracenylmethyldimethylmethylammoniumethyl methacrylate bromide, anthracenyldimethylmethylammoniumethyl methacrylate bis(trifluoromethyl)sulfonimide, anthracenyldimethylnaphthylammoniumethyl methacrylate bis(nonafluorobutanesulfonyl)imide, diethylpyrenylmethylammoniumethyl methacrylate chloride, diethylpyrenylmethylammoniumethyl methacrylate bromide, diethylpyrenylmethylammoniumethyl methacrylate bis(trifluoromethyl)sulfonimide, and diethylpyrenylmethylammoniumethyl methacrylate bis(nonafluorobutanesulfonyl)imide.

[Constituent Unit (2)]

The polymeric dispersant is preferably the polymer further having a constituent unit (2) represented by the following formula (2). By using the polymer further having the constituent unit (2) as the polymeric dispersant, the dispersibility of the carbon material can be enhanced more. Note that by making an amino group in the constituent unit (2) into a quaternary salt, the quaternary ammonium salt group in the constituent unit (1) can be formed.

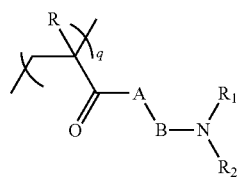

(2)

wherein R represents a hydrogen atom or a methyl group. A represents O or NH, B represents an ethylene group or a propylene group, $R_1$ and $R_2$ each independently represent a methyl group or an ethyl group, and q represents an arbitrary number of repetition.

Examples of a monomer (monomer 2) capable of forming the constituent unit (2) include a monomer represented by the following formula (2a).

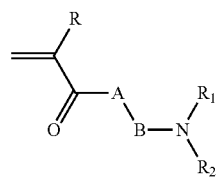

(2a)

wherein R represents a hydrogen atom or a methyl group, A represents O or NH, B represents an ethylene group or a propylene group, and $R_1$ and $R_2$ each independently represent a methyl group or an ethyl group.

The constituent unit (2) has an amino group that is a basic group. Therefore, it is considered that a carboxy group or a phenolic hydroxy group formed on the surface of the carbon material due to oxidation or the like forms an ionic bond with an amino group in the constituent unit (2), and thereby the polymeric dispersant is likely to be adsorbed to the carbon material, so that the dispersibility of the carbon material is improved more. Further, it is considered that the dispersibility of the carbon material is improved more by a synergistic effect with adsorption of the quaternary ammonium salt group in the constituent unit (1) or a multicyclic aromatic group forming the quaternary ammonium salt group to the carbon material.

The constituent unit (2) is preferably represented by the following formula (2-1).

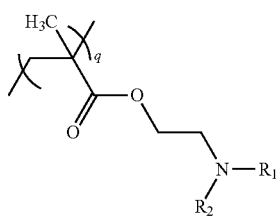

(2-1)

wherein $R_1$ and $R_2$ each independently represent a methyl group or an ethyl group, and q represents an arbitrary number of repetition.

The constituent unit represented by formula (2-1) is formed from, for example, a monomer represented by the following formula (2a-1).

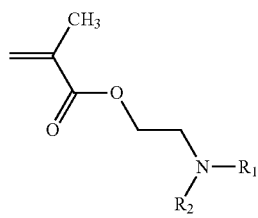

(2a-1)

wherein $R_1$ and $R_2$ each independently represent a methyl group or an ethyl group.

Specific examples of the monomer capable of forming the constituent unit represented by formula (2-1) include dimethylaminoethyl methacrylate and diethylaminoethyl methacrylate.

[Constituent Unit (3)]

The constituent unit (3) is a constituent unit having a polyalkylene glycol chain. The polymeric dispersant having this constituent unit (3) is a polymer having a structure in which the polyalkylene glycol chain is grafted. Then, the polyalkylene glycol chain is a molecular chain capable of dissolving in the organic solvent which is a dispersion medium. A urethane bond (NHCOO) or a urea bond (NHCONH), represented by Y in formula (3), forms a hydrogen bond with a hydrogen atom forming a hydroxy group or the like which is generated on the surface of the carbon material by modification. Therefore, with regard to the polymeric dispersant, the polyalkylene glycol chain which is a graft chain dissolves in the organic solvent which is a dispersion medium, and the urethane bond (NHCOO) or a urea bond (NHCONH) in the constituent unit (3) and the main chain containing the constituent unit (1) are adsorbed to the carbon material. Then, the dissolved polyalkylene glycol chains repel one another because of steric hindrance among carbon materials in the form of particles, making it possible to disperse the carbon material in the liquid medium favorably and stably over a long period of time.

In formula (3), m represents an average number of repeating units of a propyleneoxy group (—CH(CH$_3$)CH$_2$O—), and n represents an average number of repeating units of an ethyleneoxy group (—CH$_2$CH$_2$O—). Then, m and n each independently represent a numerical value of 0 or more and satisfy m+n=20 to 100, and preferably m+n=35 to 100. That is, the molecular weight of the polyalkylene glycol chain is preferably 880 to 5,800, and more preferably 1,540 to 5,800. Note that the C1-18 alkyl group represented by $R_3$ in formula (3) is preferably a methyl group, an ethyl group, a propyl group, a butyl group, a dodecyl group, a stearyl group, a phenyl group, a naphthyl group, or a nonylphenyl group.

Examples of a monomer (monomer 3) capable of forming the constituent unit (3) include a monomer (macromonomer) represented by the following formula (3a).

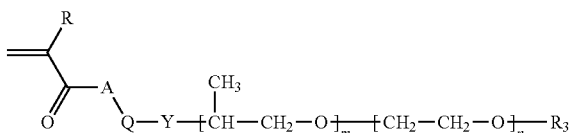

(3a)

wherein R represents a hydrogen atom or a methyl group, A represents O or NH, Q represents an ethylene group or a methylethylene group, Y represents O, NHCOO, or NHCONH, m and n each independently represent an average number of repeating units of 0 or more and satisfy m+n=20 to 100, and $R_3$ represents a C1-18 alkyl group, aryl group, or alkylaryl group.

The constituent unit (3) is preferably represented by the following formula (3-1).

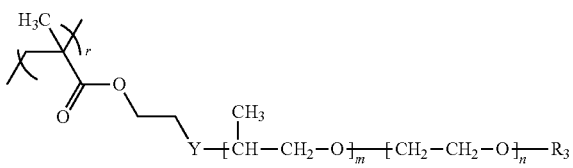

(3-1)

wherein Y represents NHCOO or NHCONH, m and n each independently represent an average number of repeating units of 0 or more and satisfy m+n=20 to 100, $R_3$ represents a C1-18 alkyl group, aryl group, or alkylaryl group, and r represents an arbitrary number of repetition.

The constituent unit represented by formula (3-1) is formed from, for example, a monomer represented by the following formula (3a-1).

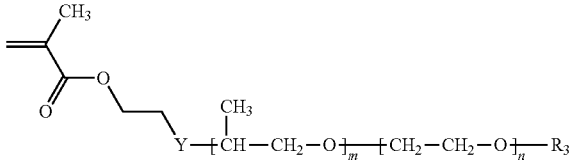

(3a-1)

wherein Y represents NHCOO or NHCONH, m and n each independently represent an average number of repeating units of 0 or more and satisfy m+n=20 to 100, and $R_3$ represents a C1-18 alkyl group, aryl group, or alkylaryl group.

Examples of the monomer capable of forming the constituent unit represented by formula (3-1) include a macromonomer having a urethane bond (NHCOO) as Y, the macromonomer obtained by reacting methacryloyloxyethyl isocyanate and a glycol ether monoalkyl ether, such as polyethylene glycol monomethyl ether, polyethylene glycol polypropylene glycol monobutyl ether, polypropylene glycol monomethyl ether, or polyethylene glycol monododecyl ether; and a macromonomer having a urea bond (NHCONH) as Y, the macromonomer obtained by reacting methacryloyloxyethyl isocyanate and a monoether monoamine, such as polyethylene glycol polypropylene glycol monoamine.

In formulas (3), (3a), (3-1), and (3a-1), Y is preferably a urea bond (NHCONH) that does not need a catalyst when an isocyanate and an amine are reacted. In addition, the polyalkylene glycol chain in formulas (3), (3a), (3-1), and (3a-1) is preferably a random copolymer of propylene oxide and ethylene oxide. Further, in formulas (3), (3a), (3-1), and (3a-1), $R_3$ is preferably a methyl group. Note that the molecular weight of the polyalkylene glycol chain is preferably 2,000 to 4,000, and m and n preferably satisfy m+n=36 to 90.

[Constituent Unit (4)]

The constituent unit (4) is an additional constituent unit that can connect the above-described constituent units. Examples of a monomer (monomer 4) capable of forming the constituent unit (4) include (meth)acrylic acid-based monomers such as (meth)acrylic acid and a (meth)acrylic acid ester; and vinyl monomers such as styrene, vinyltoluene, vinylpyridine, vinylcaprolactone, vinylimidazole, α-methylstyrene, and vinyl acetate. Among these, α-methylstyrene is preferable from the viewpoint of making it easy to control the molecular weight.

(Composition and Physical Properties of Polymeric Dispersant)

In the polymeric dispersant (polymer), the proportion of the constituent unit (1) in the total amount of all the constituent units is 3 to 55% by mass, preferably 5 to 50% by mass. When the proportion of the constituent unit (1) is less than 3% by mass, the adsorption to the carbon material is insufficient. On the other hand, when the proportion of the constituent unit (1) is more than 55% by mass, the solubility in the organic solvent is insufficient.

In the polymer, the proportion of the constituent unit (2) in the total amount of all the constituent units is preferably 30% by mass or less, more preferably 2 to 25% by mass. Note that the amine value of the polymer is 100 mgKOH/g or less, preferably 3 to 90 mgKOH/g. When the proportion of the constituent unit (2) is more than 30% by mass, coloration may occur to the polymer in some cases.

In the polymer, the proportion of the constituent unit (3) in the total amount of all the constituent units is 45 to 90% by mass, preferably 50 to 85% by mass. That is, the constituent unit (3) is a constituent unit contained in a relatively large amount in the polymer. When a large amount of the constituent unit (3) is contained, thereby the polyalkylene glycol chains are densely disposed. Therefore, when the polymer as the polymeric dispersant is adsorbed to the carbon material, the densely disposed polyalkylene glycol chains function as steric hindrance to inhibit the carbon materials from being into close proximity, thereby making it possible to disperse the carbon material stably.

When the proportion of the constituent unit (3) in the polymer is less than 45% by mass, sufficient steric hindrance is not formed, making it difficult to enhance the dispersibility. On the other hand, when the proportion of the constituent unit (3) is more than 90% by mass, the macromonomer that forms the constituent unit (3) may be left unpolymerized in some cases because the reactivity of the macromonomer is somewhat poor.

In the polymer, the proportion of the constituent unit (4) in the total amount of all the constituent units is 0.5 to 20% by mass, preferably 0.6 to 16% by mass. When the proportion of the constituent unit (4) is more than 0.5% by mass, the function as a dispersant is lowered because the content of the other constituent units is relatively decreased.

Because a carbon material dispersion can be made such that the carbon material is contained at a high concentration but is more unlikely to reaggregate and is more stably dispersed, it is preferable that the constituent unit (1), the constituent unit (2), and the constituent unit (3) be represented by formula (1-1), formula (2-1), and formula (3-1), respectively, and the constituent unit (4) contain a constituent unit derived from α-methylstyrene.

The number average molecular weight (Mw) in terms of polystyrene of the polymer which is used as the polymeric dispersant, measured by gel permeation chromatography (GPC), is 5,000 to 20,000, preferably 10,000 to 15,000. When the number average molecular weight of the polymer is lower than 5,000, the introduction amount of the constituent unit (3) derived from the macromonomer is small, so that sufficient dispersion stability cannot be obtained. On the other hand, when the number average molecular weight of the polymer is more than 20,000, the amount of the polymeric dispersant necessary for dispersing the carbon material is too large and the viscosity of a resultant carbon material dispersion is excessively high.

(Method for Synthesizing Polymeric Dispersant)

The polymer which is the polymeric dispersant can be synthesized by a conventionally known method. For example, the polymer can be synthesized by a conventionally known radical polymerization method; and a living radical polymerization method, such as a polymerization method in which the molecular weight is adjusted using a chain transfer agent such as a thiol, an Atom Transfer Radical Polymerization method (ATRP method), a Reversible Addition-Fragmentation Chain Transfer Polymerization method (RAFT method), a Nitroxide-Mediated Polymerization method (NMP method), an Organotellurium-Mediated Living Radica Polymerization method (TERP method), an Iodine Transfer Polymerization method (ITP method), a Reversible chain Transfer Catalyzed Polymerization method (RTCP method), or a Reversible Complexation Mediated Polymerization method (RCMP) method. Among these, a living radical polymerization method is preferable because the molecular weight of the main chain can be controlled more uniformly and an A-B block copolymer can be made according to the addition method.

The polymerization may be any of thermal polymerization and photopolymerization, and an azo-based radical generator, a peroxide-based radical generator, a photosensitizer, and the like may be added to the polymerization reaction system. The polymerization type may be any of solventless, solution polymerization, and emulsion polymerization, and among these, solution polymerization is preferable. It is preferable to use, in solution polymerization, the same organic solvent as the organic solvent which is used for the carbon material dispersion because a polymer after the polymerization reaction can be used as it is for the carbon material dispersion.

For example, by subjecting the above-described monomers to solution polymerization, an intended polymer (polymeric dispersant) can be obtained. Note that by adding a halogenated alkyl, such as benzyl chloride, naphthylmethyl chloride, acetynylmethyl chloride, pyrenylmethyl chloride, or naphthylmethyl bromide, to a reaction solution obtained by polymerizing a monomer which forms the constituent unit (2), a monomer which forms the constituent unit (3), and a monomer which forms the constituent unit (4), an amino group in the constituent unit (2) can be changed into a quaternary ammonium salt to change the constituent unit (2) into the constituent unit (1). Further, by adding a lithium salt of bis(trifluoromethylsulfone)imide, a lithium salt of bis(heptafluorobutylsulfone)imide, or the like, ion exchange can be performed for the anion (Cl⁻, Br⁻) which forms the quaternary ammonium salt.

(Carbon Material Dispersion)

The content of the carbon material in the carbon material dispersion is preferably set to 15% by mass or less, more preferably 0.5 to 12% by mass. In addition, the content of the polymeric dispersant based on 100 parts by mass of the carbon material is preferably 10 to 200 parts by mass, more preferably 20 to 150 parts by mass, particularly preferably 30 to 100 parts by mass. When the amount of the polymeric dispersant based on the amount of the carbon material is excessively small, dispersibility may be somewhat insufficient in some cases. On the other hand, when the amount of the polymeric dispersant based on the amount of the carbon material is excessively large, the ratio of the carbon material is relatively lowered, so that a resultant carbon dispersion is likely to become viscous.

A resin other than the polymeric dispersant, an additive, and the like can be contained in the carbon material dispersion. Examples of the resin other than the polymeric dispersant include a polyolefin resin, a polyhalogenated olefin resin, a polyester resin, a polyamide resin, a polyimide resin, a polyether resin, a polyvinyl resin, a polystyrene resin, a polyvinyl alcohol resin, a polymethacrylate resin, a polyurethane resin, a polyepoxy resin, a polyphenol resin, a polyurea resin, and a polyethersulfone resin. Examples of the additive include an oil-soluble dye, a pigment, an ultraviolet absorber, a light stabilizer, an antioxidizing agent, a leveling agent, a defoamer, an antiseptic, a mildew-proofing agent, a photopolymerization initiator, and other pigment dispersants.

(Method for Producing Carbon Material Dispersion)

By dispersing the carbon material in a liquid medium containing the organic solvent using the polymer which is the polymeric dispersant, an intended carbon material dispersion can be obtained. As the method for subjecting the carbon material to a dispersion treatment using the polymeric dispersant, a conventionally known method can be adopted. Specifically, a dispersion method, such as stirring with a disper, kneading with three rolls, ultrasonic dispersion, dispersion with a bead mill, or dispersion using an emulsifying apparatus, a high-pressure homogenizer, or the like, can be used. Among these, dispersion with a bead mill, ultrasonic dispersion, and dispersion using a high-pressure homogenizer are preferable because of a high dispersion effect.

(Method for Evaluating Dispersibility of Carbon Material)

As a method for evaluating the dispersibility of the carbon material in the carbon material dispersion, there is an absorbance measurement method using a spectrophotometer, as described below. First of all, a plurality of dispersions which contain the carbon material at an extremely low concentration and in which the concentration is known is prepared and the absorbance at a particular wavelength is measured for these dispersions to make a calibration curve in which the absorbance is plotted versus the concentration of the carbon material. Next, the carbon material, the organic solvent, and the polymeric dispersant are mixed to perform a dispersion treatment by a proper method. Thereafter, the carbon material left undispersed is settled down by a centrifugal separation treatment for removal by separation to obtain a supernatant solution. After the obtained supernatant solution is diluted to a concentration where the absorbance can be measured, the absorbance is measured to calculate the concentration of the carbon material from the calibration curve. Then, by comparing the calculated concentration of the carbon material in the carbon material dispersion and the amount of the carbon material charged, the dispersibility of the carbon material can be evaluated.

In addition, the dispersibility of the carbon material can also be evaluated by a method in which the carbon material dispersion after the centrifugal separation treatment is left to stand still for a long period of time to check whether aggregates are present or not. Further, the dispersion state may be evaluated using an electron microscope or the like after dropping the carbon material dispersion on a glass plate or the like, or the dispersion state may be evaluated by measuring the electric conductivity of a coating film formed by applying and drying the carbon material dispersion to check whether the electric conductivity has reached a predetermined electric conductivity or not.

<Use of Carbon Material Dispersion>

The above-described carbon material dispersion can be used as a material for a paint, an ink, a plastic product, or the like in which the carbon material is contained in a dispersed state, and utilization as an electrically conductive material, a pyroconductive material, and an antistatic material is expected. The paint or ink in which the carbon material is contained in a dispersed state can be prepared by, for example, a method in which a solvent, a resin, an additive, and the like are added to the carbon material dispersion such that a predetermined paint composition or an ink composition is obtained to make the carbon material dispersion into the paint or ink. In addition, an intended paint or ink can also be prepared by a method of adding the carbon material dispersion to a commercially available paint or ink. The plastic product in which the carbon material is contained in a dispersed state can be produced by, for example, a method in which the carbon material dispersion is added and mixed into a plastic material in a molten state and thereafter a solvent is removed. In addition, a desired plastic product can also be produced by a method in which the carbon material dispersion is added and mixed into a plastic material in a fine powder state, and thereafter a solvent is removed or the carbon material is deposited.

EXAMPLES

Hereinafter, the present invention will be described specifically based on Examples, but the present invention is not limited to these Examples. Note that "parts" and "%" in Examples and Comparative Examples are each on a mass basis unless otherwise noted.

Synthesis of Polymeric Dispersant (Polymer)

Synthesis Example 1: Polymeric Dispersant D-1

In a reaction apparatus equipped with a stirrer, a reflux condenser, a thermometer, and a dropping funnel, 100 parts (0.05 mol) of a one-end aminated polypropylene glycol polyethylene glycol monomethyl ether (trade name "JEFFAMINE M2005," manufactured by Huntsman Corporation, m+n=35 (m=29, n=6), measured amine value 28.05 mgKOH/g) (M2005) and 100 parts of a polypropylene glycol monomethyl ether acetate (PGMAc) were placed, and a resultant mixture was stirred at room temperature for 10 minutes to make the mixture uniform. In another container, 7.75 pars (0.05 mol) of 2-isocyanatoethyl methacrylate (trade name "Karenz MOI," manufactured by Showa Denko K.K.) (MOI) and 7.75 parts of PGMAc were placed, and a resultant mixture was stirred to prepare a mixed solution. The mixed solution prepared was dropped into the reaction apparatus over 30 minutes for reaction. Part of the reaction solution was sampled for IR measurement to ascertain disappearance of the isocyanate group derived from MOI and generation of a urea bond. In addition, the amine value of the product, measured using a 0.1 mol/L 2-propanolic hydrochloric acid solution by means of an automatic potentiometric titrator, was 0.1 mgKOH/g. Thereby, it was ascertained that the reaction between the amino group and the isocyanate group was almost completed. The obtained product is a macromonomer (MCR-1) in which a methacryloyl group is bonded to one end of polypropylene glycol polyethylene glycol monomethyl ether (PPG/PEG). The solid content of the MCR-1 solution, measured using a moisture meter, was 50.0%. Further, the number average molecular weight (Mn) of MCR-1 in terms of polystyrene, measured by gel permeation chromatography (GPC) using tetrahydrofuran (THF) as a developing solution, was 3,400.

In a reaction apparatus equipped with a stirrer, a reflux condenser, a thermometer, and a nitrogen introducing tube, 49.6 parts of PGMAc, 215.5 parts of the MCR-1 solution, 1.8 parts of α-methylstyrene (αMS), 25.1 parts of styrene (St), and 19.2 parts (0.122 mol) of 2-(N,N-dimethylamino) ethyl methacrylate (DMAEMA) were placed and heated under nitrogen bubbling. At a point in time when the internal temperature reached 70° C., 3.0 parts of dimethyl 2,2'-azobis (isobutyrate) (trade name "V-601," manufactured by FUJIFILM Wako Pure Chemical Corporation) (V-601) was added, and the temperature was increased to 75° C. to perform polymerization for 4 hours. Then, 0.5 parts of V-601 was added to further perform polymerization at 75° C. for 4 hours. Mn, the polydispersion index (PDI), and the molecular weight at the peak top (PT) of the product, measured by sampling part of the reaction solution, were 8,500, 1.65, and 14,000, respectively, and a peak derived from MCR-1 was hardly recognized. The solid content of the reaction solution was 50.1%. In addition, the amine value of the product (in terms of net content of resin) was 44.6 mgKOH/g.

A solution of 7.8 parts of PGMAc and 7.8 parts (0.0616 mol) of benzyl chloride (BzCl) was dropped over 30 minutes under a room temperature condition. After the dropping, a resultant solution was heated to 80° C., and the temperature was retained for 5 hours to obtain a solution containing polymeric dispersant D-1. Mn, PDI, and PT of polymeric dispersant D-1 were 8,700, 1.66, and 14,400, respectively. The solid content of the solution containing polymeric dispersant D-1 was 50.0%. The amine value of polymeric dispersant D-1 (in terms of net content of resin) was 21.0 mgKOH/g, and it was ascertained that reaction had progressed almost quantitatively. Polymeric dispersant D-1 obtained is a resin obtained by changing 50% of the amino group derived from DMAEMA into a quaternary salt using BzCl.

Synthesis Examples 2 to 5: Polymeric Dispersants D-2 to D-5

Polymeric dispersants D-2 to D-5 were obtained in the same manner as in Synthesis Example 1 described above except that formulations shown in Table 1 were adopted. The meanings of abbreviations in Table 1 are shown below.

M41: One-end-aminated polypropylene glycol polyethylene glycol methyl ether (trade name "Genamin M41/2000," manufactured by Clariant AG, m+n=41 (m=9, n=32))

DMQ: Benzyl chloride salt of 2-(N,N-dimethylaminoethyl) methacrylate

MMA: Methyl methacrylate

The method of calculating the compositions of DMQ in Table 1 is described taking Synthesis Example 1 as an example. In the polymer, 19.2 parts (0.122 mol) of DMAEMA (Mw 157.1) and 7.8 parts (0.0616 mol) of BzCl (Mw 126.6) added have quantitatively reacted. Therefore, the amount of DMQ (Mw 283.6) generated is 0.0616 mol×283.6=17.5 parts. Hereinafter, the compositions of DMQ in the polymers were calculated in the same manner in view of the quaternary salt formation ratio.

The method of calculating the theoretical values of the amine values of the polymers is described taking Synthesis Example 1 as an example. A half (0.0616 mol) of 19.2 parts (0.122 mol) of DMAEMA in the polymer disappears by the reaction with BzCl, and therefore the amount of DMAEMA left in the polymer is 0.122×0.5×157.1=9.6 parts. DMAEMA is contained in an amount of 9.6/(100+7.75+17.5+9.6+1.8+25.1)×100=0.059 g in 1 g of the polymer. Therefore, the amine value can be calculated as 0.059/157.1×56.1×1000=21.1 mgKOH/g.

TABLE 1

Compositions and physical properties of polymers obtained in Synthesis Examples 1 to 5

| | | | Synthesis Example 1 | Synthesis Example 2 | Synthesis Example 3 | Synthesis Example 4 | Synthesis Example 5 |
|---|---|---|---|---|---|---|---|
| Polymeric dispersant | | | D-1 | D-2 | D-3 | D-4 | D-5 |
| Solvent | PGMAc | | 107.75 | 107.75 | 107.75 | 108.02 | 108.02 |
| Monomer 3 (macromonomer) | | Name | MCR-1 | MCR-1 | MCR-1 | MCR-2 | MCR-2 |
| | PPG/PEG | M2005 | 100 | 100 | 100 | — | — |
| | | M41 | — | — | — | 100 | 100 |
| | | Composition | PO/EO | PO/EO | PO/EO | PO/EO | PO/EO |
| | | Composition ratio (molar ratio) | 29/6 | 29/6 | 29/6 | 1/4 | 1/4 |
| | | MOI | 7.75 | 7.75 | 7.75 | 8.02 | 8.02 |
| | | Mn | 3,400 | 3,400 | 3,400 | 3,300 | 3,300 |
| | | PDI | 1.19 | 1.19 | 1.19 | 1.05 | 1.05 |
| Whole | | V601 | 3.5 | 3.5 | 3.5 | 3.5 | 3.5 |
| | | PGMAc | 57.4 | 76.4 | 85.3 | 55.9 | 25.1 |
| | | BzCl | 7.8 | 26.8 | 35.7 | 3.6 | 6.8 |
| | Monomer 1 | DMQ | 17.5 | 59.9 | 80.0 | 8.0 | 15.2 |
| | Monomer 2 | DMAEMA | 19.2 | 44.3 | 44.3 | 44.3 | 8.4 |
| | Monomer 4 | αMS | 1.8 | 1.8 | 1.8 | 4.5 | 1.0 |

TABLE 1-continued

Compositions and physical properties of polymers obtained in Synthesis Examples 1 to 5

|  | Synthesis Example 1 | Synthesis Example 2 | Synthesis Example 3 | Synthesis Example 4 | Synthesis Example 5 |
|---|---|---|---|---|---|
| St | 25.1 | — | — | — | — |
| MMA | — | — | — | — | 5.4 |
| Composition | DMQ/ DMAEMA/ MCR-1/αMS/St | DMQ/ DMAEMA/ MCR-1/αMS | DMQ/ DMAEMA/ MCR-1/αMS | DMQ/ DMAEMA/ MCR-2/αMS | DMQ/ DMAEMA/ MCR-2/αMS/ MMA |
| Composition ratio (mass ratio) | 10.8/5.9/66.7/ 1.1/15.5 | 33.2/6.1/ 59.7/10 | 42.2/0/ 56.9/0.9 | 5.0/24.9/ 67.3/2.8 | 11.7/0/83.3/ 0.8/4.2 |
| Main chain/ macromonomer | 33.3/66.7 | 40.3/59.7 | 43.2/56.8 | 32.7/67.3 | 16.7/83.3 |
| Mn | 8,700 | 8,100 | 8,000 | 7,000 | 16,200 |
| PDI | 1.66 | 1.58 | 1.53 | 1.80 | 1.76 |
| Amine value (mgKOH/g) | 21.0 | 21.8 | ≈0 | 88.9 | ≈0 |
| Quaternary salt formation ratio (%) | 50 | 75 | 100 | 10 | 100 |
| Solid content (%) | 50.1 | 50.0 | 50.2 | 50.1 | 49.9 |

Synthesis Example 6: Polymeric Dispersant D-6

In a reaction apparatus equipped with a stirrer, a reflux condenser, a thermometer, and a nitrogen introducing tube, 49.5 parts of PGMAc, 216 parts of the MCR-1 solution, 1.8 parts of αMS, 12.5 parts of benzyl methacrylate (BzMA), and 31.7 parts (0.202 mol) of DMAEMA were placed and heated under nitrogen bubbling. At a point in time when the internal temperature reached 70° C., 3.0 parts of V-601 was added, and the temperature was increased to 75° C. to perform polymerization for 4 hours. Then, 0.5 parts of V-601 was added to further perform polymerization at 75° C. for 4 hours. Mn, PDI, and PT of the product, measured by sampling part of the reaction solution, were 10,600, 1.89, and 20,200, respectively, and a peak derived from MCR-1 was hardly recognized. The solid content of the reaction solution was 50.1%. In addition, the amine value of the product (in terms of net content of resin) was 113.2 mgKOH/g.

A quaternary salt forming reaction was performed in the same manner as in Synthesis Example 1 described above except that 17.8 parts (0.101 mol) of 1-chloromethylnaphthalene (CMN) was used in place of BzCl, and thereby a solution containing polymeric dispersant D-6 was obtained. Mn, PDI, and PT of polymeric dispersant D-6 were 10,900, 1.88, and 20,300, respectively. The solid content of the solution containing polymeric dispersant D-6 was 50.0%. The amine value of polymeric dispersant D-6 (in terms of net content of resin) was 32.8 mgKOH/g. Polymeric dispersant D-6 obtained is a resin obtained by changing 50% of the amino group derived from DMAEMA into a quaternary salt using CMN.

Synthesis Examples 7 and 8: Polymeric Dispersants D-7 and D-8

Polymeric dispersants D-7 and D-8 were obtained in the same manner as in Synthesis Example 6 described above except that formulations shown in Table 2 were adopted.

The meanings of abbreviations in Table 2 are shown below.

CMA: 9-Chloromethylanthracene
CMP: 1-Chloromethylpyrene
PME-4000: Methacrylate terminated methoxy polyethylene glycol (trade name "BLEMMER PME-4000," manufactured by NOF CORPORATION, m=0, n=90)
NQ: 1-Chloromethylnaphthalene salt of 2-(N,N-dimethylaminoethyl) methacrylate
AQ: 9-Chloromethylanthracene salt of 2-(N,N-dimethylaminoethyl) methacrylate
PQ: 1-Chloromethylpyrene salt of 2-(N,N-dimethylaminoethyl) methacrylate

TABLE 2

Compositions and physical properties of polymers obtained in Synthesis Examples 6 to 8

|  |  |  |  | Synthesis Example 6 | Synthesis Example 7 | Synthesis Example 8 |
|---|---|---|---|---|---|---|
|  | Polymeric dispersant |  |  | D-6 | D-7 | D-8 |
| Solvent | PGMAc |  |  | 107.75 | 108.02 | 100 |
| Monomer 3 (macro- monomer) | Name |  |  | MCR-1 | MCR-2 | MCR-3 |
|  | Polyalkylene glycol | M2005 |  | 100 | — | — |
|  |  | M41 |  | — | 100 | — |
|  |  | PME-4000 |  | — | — | 100 |
|  |  | Composition |  | PO/PE | PO/PE | PE |
|  |  | Composition ratio (molar ratio) |  | 29/6 | 1/4 | — |
|  |  | MOI |  | 7.75 | 8.02 | — |
|  |  | Mn |  | 3,400 | 3,300 | 4000 |
|  |  | PDI |  | 1.19 | 1.05 | 1.06 |

TABLE 2-continued

Compositions and physical properties of polymers obtained in Synthesis Examples 6 to 8

|  |  |  | Synthesis Example 6 | Synthesis Example 7 | Synthesis Example 8 |
|---|---|---|---|---|---|
| Whole | V601 |  | 3.5 | 3.5 | 3.5 |
|  | PGMAc |  | 67.3 | 109.6 | 62.1 |
|  | CMN |  | 17.8 | — | — |
|  | CMA |  | — | 57.4 | — |
|  | CMP |  | — | — | 12.6 |
|  | Monomer 1 | NQ | 33.7 | — | — |
|  |  | AQ | — | 97.2 | — |
|  |  | PQ | — | — | 20.6 |
|  | Monomer 2 | DMAEMA | 31.7 | 44.2 | 31.7 |
|  | Monomer 4 | αMS | 1.8 | 4.5 | 1.8 |
|  |  | St | — | — | 12.5 |
|  |  | BzMA | 12.5 | — | — |
|  | Composition |  | NQ/DMAEMA/ MCR-1/αMS/ BzMA | AQ/DMAEMA/ MCR-2/αMS | PQ/DMAEMA/ MCR-3/αMS/St |
|  | Composition ratio (mass ratio) |  | 19.6/9.2/62.8/ 1.1/7.3 | 45.4/2.1/ 50.4/2.1 | 13.0/15.0/ 63.0/1.1/7.9 |
|  | Main chain/macromonomer |  | 37.2/62.8 | 49.6/50.4 | 37.0/63.0 |
|  | Mn |  | 10,900 | 8,300 | 11,500 |
|  | PDI |  | 1.88 | 1.96 | 1.85 |
|  | Amine value (mgKOH/g) |  | 32.8 | ≈0 | 53.5 |
|  | Quaternary salt formation ratio (%) |  | 50 | 90 | 25 |
|  | Solid content (%) |  | 50 | 50.4 | 50.2 |

Synthesis Example 9: Polymeric Dispersant D-9

In a reaction apparatus equipped with a stirrer, a reflux condenser, and a thermometer, 100.0 parts (solid content 50.0%) of the solution containing polymeric dispersant D-2 and 150.0 parts of PGMAc were placed, and a resultant mixture was stirred to prepare a uniform solution. Then, 5.04 parts (0.0176 mol, 30% based on the amount of DMQ) of lithium bis(trifluromethanesulfonyl)imide (TFSILi) was added and dissolved. Thereby, a quaternary ammonium salt containing a bis(trifluromethanesulfonyl)imide anion (TFSI) as a counter ion was generated to obtain a solution containing polymeric dispersant D-9. The solid content of the solution containing polymeric dispersant D-9 was 21.5%. The amine value of polymeric dispersant D-9 (in terms of net content of resin) was 21.8 mgKOH/g. An attempt to measure Mn of polymeric dispersant D-9 by GPC was made, but Mn was not able to be measured accurately because of strong adsorption of the polymeric dispersant to the column. When TFSILi reacts with equimolar DMQ, equimolar LiCl (Mw 42.4) is generated. Therefore, the amount of the quaternary salt generated by the reaction between TFSILi and DMQ can be calculated as follows.

0.0176 mol×(283.7+287.1)−0.0176 mol×42.4=9.30 parts

Synthesis Examples 10 and 11: Polymeric Dispersants D-10 and D-11

Polymeric dispersants D-10 and D-11 were obtained in the same manner as in Synthesis Example 9 described above except that formulations shown in Table 3 were adopted. The meanings of abbreviations in Table 3 are shown below.

DMTFSI: Quaternary salt obtained by salt exchange in which chloride ion of DMQ is exchanged for bis(trifluoromethanesulfonyl)imide DMNFSI: Quaternary salt obtained by salt exchange in which chloride ion of DMQ is exchanged for bis(nonafluorobutanesulfonyl)imide NTFSI: Quaternary salt obtained by salt exchange in which chloride ion of NQ is exchanged for bis(trifluoromethanesulfonyl)imide

TABLE 3

Compositions and physical properties of polymers obtained in Synthesis Examples 9 to 11

|  |  | Synthesis Example 9 | Synthesis Example 10 | Synthesis Example 11 |
|---|---|---|---|---|
| Polymeric dispersant |  | D-9 | D-10 | D-11 |
| Prepolymer | D-2 | 100 | — | — |
|  | D-5 | — | 100 | — |
|  | D-6 | — | — | 100 |
| Whole | PGMAc | 150 | 150 | 150 |
|  | TFSILi | 5.04 | — | 7.25 |
|  | NFSILi | — | 15.7 | — |
|  | Composition | DMQ/DMTFSI/ DMAEMA/ MCR-1/αMS | DMNFSI/ DMAEMA/ MCR-2/αMS/ MMA | NQ/NTFSI/ DMAEMA/ MCR-1/αMS/ BzMA |
|  | Composition ratio (mass ratio) | 23.1/10.3/6.1/ 59.5/1.0 | 28.0/0/68.0/ 0.6/3.4 | 9.2/15.9/8.6/ 58.5/1.0/6.8 |

TABLE 3-continued

Compositions and physical properties of polymers
obtained in Synthesis Examples 9 to 11

|  | Synthesis Example 9 | Synthesis Example 10 | Synthesis Example 11 |
|---|---|---|---|
| Main chain/ macromonomer (mass ratio) | 40.5/59.5 | 32.0/68.0 | 41.4/58.6 |
| Salt exchange ratio (%) | 30 | 100 | 50 |
| Amine value (mgKOH/g) | 21.8 | ≈0 | 30.6 |
| Solid content (%) | 21.5 | 23.6 | 21.3 |

Comparative Synthesis Example 1: Polymeric Dispersant HD-1

Polymerization was performed in the same manner as in Synthesis Example 1 described above except that a formulation shown in Table 4 was adopted and that αMS and St were dropped over 1 hour using a dropping funnel. Mn, PDI, and PT of the product, measured by sampling part of the reaction solution, were 18,900, 1.85, and 34,300, respectively. The solid content of the reaction solution was 50.5%. In addition, the amine value of the product (in terms of net content of resin) was 28.5 mgKOH/g.

A solution of 7.8 parts of PGMAc and 17.8 parts (0.0616 mol) of BzCl was dropped over 30 minutes under a room temperature condition. After the dropping, a resultant solution was heated to 80° C., and the temperature was retained for 5 hours to obtain a solution containing polymeric dispersant HD-1. Mn, PDI, and PT of polymeric dispersant HD-1 were 19,500, 1.84, and 34,800, respectively. The solid content of the solution containing polymeric dispersant HD-1 was 50.4%. The amine value of polymeric dispersant HD-1 (in terms of net content of resin) was 13.1 mgKOH/g.

Comparative Synthesis Examples 2 and 3: Polymeric Dispersants HD-2 and HD-3

Polymeric dispersants HD-2 and HD-3 were obtained in the same manner as in Comparative Synthetic Example 1 described above except that formulations shown in Table 4 were adopted. The meanings of abbreviations in Table 4 are shown below.

M600: One-end-aminated polypropylene glycol polyethylene glycol monomethyl ether, trade name "JEFFAMINE M600," manufactured by Huntsman Corporation, m+n=9 (m=9, n=0)

$NaBF_4$: Sodium tetrafluoroborate

DMBF: Quaternary salt obtained by salt exchange in which chloride ion of DMQ is exchanged for tetrafluoroborate ion

TABLE 4

Compositions and physical properties of polymers
obtained in Comparative Synthesis Examples 1 to 3

|  |  |  | Comparative Synthesis Example 1 | Comparative Synthesis Example 2 | Comparative Synthesis Example 3 |
|---|---|---|---|---|---|
|  | Polymeric dispersant |  | HD-1 | HD-2 | HD-3 |
| Solvent |  | PGMAc | 107.75 | 125.86 | 108.02 |
| Monomer 3 |  | Name | MCR-1 | MCR-4 | MCR-2 |
| (macro- | Polyalkylene | M2005 | 100 | — | — |
| monomer) | glycol | M600 | — | 100 | — |
|  |  | M41 | — | — | 100 |
|  |  | Composition | PO/EO | PO/EO | PO/EO |
|  |  | Composition ratio (molar ratio) | 29/6 | 9/1 | 1/4 |
|  |  | MOI | 7.75 | 25.86 | 8.02 |
|  |  | Mn | 3,400 | 700 | 3300 |
|  |  | PDI | 1.19 | 1.04 | 1.05 |
| whole |  | V601 | 3.5 | 3.5 | 3.5 |
|  |  | PGMAc | 155.5 | 85.3 | 65.1 + 244.4* |
|  |  | BzCl | 7.8 | 35.7 | 15.5 |
|  |  | $NaBF_4$ | — | — | 13.42 |
| Monomer 1 |  | DMQ | 17.5 | 80 | 34.7 |
|  |  | DMBF | — | — | 40.9 |
| Monomer 2 |  | DMAEMA | 19.2 | 44.3 | 19.2 |
| Monomer 4 |  | αMS | 5 | 1.8 | 1.8 |
|  |  | St | 120 | — | — |
|  |  | BzMA | — | — | 25.1 |
|  |  | Composition | DMQ/ DMAEMA/ MCR-1/ αMS/St | DMQ/ DMAEMA/ MCR-4/αMS | DMBF/ DMAEMA/ MCR-2/αMS/ BzMA |

TABLE 4-continued

Compositions and physical properties of polymers
obtained in Comparative Synthesis Examples 1 to 3

|  | Comparative Synthesis Example 1 | Comparative Synthesis Example 2 | Comparative Synthesis Example 3 |
|---|---|---|---|
| Composition ratio (mass ratio) | 6.7/3.7/41.5/ 1.9/46.2 | 38.5/0/ 60.6/0.9 | 23.3/0/61.4/ 1.0/14.3 |
| Main chain/macromonomer (mass ratio) | 58.5/41.5 | 39.4/60.6 | 39.6/61.4 |
| Mn | 19,500 | 5,500 | 12,600 |
| PDI | 1.84 | 1.7 | 1.78 |
| Amine value (mgKOH/g) | 13.1 | ≈0 | ≈0 |
| Quaternary salt formation ratio (%) | 50 | 100 | 100 |
| Salt exchange ratio (%) | — | — | 100 |
| Solid content (%) | 50.4 | 50 | 21.7 |

*Amount of PGMAc diluted in performing salt exchange reaction between NaBF$_4$ and DMQ Production of Carbon Nanotube Dispersions Example 1: CNT Dispersion-1

In a container made of a resin, 2.0 parts of a carbon nanotube (CNT) (average diameter: 15 nm, average length: 3.0 μm, MWNT), 94.01 parts of PGMAc, and 3.99 parts of the solution (solid content: 50.1%) containing polymeric dispersant D-1 were placed. CNT was wetted with the organic solvent, but was in a state of being deposited at the bottom of the container keeping the original shape, and the supernatant solution was transparent. A stirring bar was placed in the container, and the mixture was stirred with a magnetic stirrer, and an ultrasonic disperser was used to apply ultrasonic waves (output 300 W) for 60 minutes. By applying the ultrasonic waves, the solution became uniformly black and turned into a state where the aggregated state of CNT was released. The solid matter not dispersed sufficiently was separated and removed by performing a centrifugal separation treatment for sedimentation to obtain CNT dispersion-1.

Example 2: CNT Dispersion-2

In a container made of a resin, 2.0 parts of CNT, 94.00 parts of PGMAc, and 4.00 parts of the solution (solid content: 50.0%) containing polymeric dispersant D-2 were placed. CNT was wetted with the organic solvent, but was in a state of being deposited at the bottom of the container keeping the original shape, and the supernatant solution was transparent. The mixture was stirred at 8,000 rpm using a homogenizer for 60 minutes. By stirring with the homogenizer, the solution became uniformly black and turned into a state where the aggregated state of CNT was released. The solid matter not dispersed sufficiently was separated and removed by performing a centrifugal separation treatment for sedimentation to obtain CNT dispersion-2.

Example 3: CNT Dispersion-3

In a container made of a resin, 2.0 parts of CNT, 94.02 parts of PGMAc, 3.98 parts of the solution (solid content: 50.2%) containing polymeric dispersant D-3, and 150 parts of zirconium beads having a diameter of 0.5 mm$ were placed. CNT was wetted with the organic solvent, but was in a state of being deposited at the bottom of the container keeping the original shape, and the supernatant solution was transparent. A dispersion treatment was performed for 60 minutes using Scandex. By performing the dispersion treatment with Scandex, the solution became uniformly black and turned into a state where the aggregated state of CNT was released. The solid matter not dispersed sufficiently was separated and removed by performing a centrifugal separation treatment for sedimentation to obtain CNT dispersion-3.

Examples 4 to 11 and Comparative Examples 1 to 3: CNT Dispersions-4 to 14

CNT dispersions-4 to 14 were obtained in the same manner as in Examples 1 to 3 described above except that formulations shown in Table 5 were adopted and that dispersion treatments were performed using dispersers shown in Table 5.

TABLE 5

Preparation of CNT dispersions

|  | CNT | | Polymeric dispersant | | Amount (parts) based on 100 parts of CNT | Solvent | | Total (parts) | Disperser |
|---|---|---|---|---|---|---|---|---|---|
|  | CNT dispersion | Amount (parts) | Name | Amount* (parts) |  | Type | Amount (parts) |  |  |
| Example 1 | -1 | 2 | D-1 | 3.99 | 100 | PGMAc | 94.01 | 100 | Ultrasonic disperser |
| Example 2 | -2 | 2 | D-2 | 4.00 | 100 | PGMAc | 94.00 | 100 | Homogenizer |
| Example 3 | -3 | 2 | D-3 | 3.98 | 100 | PGMAc | 94.02 | 100 | Scandex |

TABLE 5-continued

Preparation of CNT dispersions

|  | CNT dispersion | CNT Amount (parts) | Polymeric dispersant Name | Amount* (parts) | Amount (parts) based on 100 parts of CNT | Solvent Type | Amount (parts) | Total (parts) | Disperser |
|---|---|---|---|---|---|---|---|---|---|
| Example 4 | −4 | 2 | D-4 | 3.99 | 100 | PGMAc | 94.01 | 100 | Scandex |
| Example 5 | −5 | 2 | D-5 | 4.01 | 100 | PGMAc | 93.99 | 100 | Ultrasonic disperser |
| Example 6 | −6 | 2 | D-6 | 3.20 | 80 | PGMAc | 94.80 | 100 | Scandex |
| Example 7 | −7 | 2 | D-7 | 3.17 | 80 | PGMAc | 94.83 | 100 | Homogenizer |
| Example 8 | −8 | 2 | D-8 | 3.19 | 80 | PGMAc | 94.81 | 100 | Ultrasonic disperser |
| Example 9 | −9 | 2 | D-9 | 9.30 | 100 | PGMAc | 88.70 | 100 | Homogenizer |
| Example 10 | −10 | 2 | D-10 | 8.47 | 100 | PGMAc | 89.53 | 100 | Scandex |
| Example 11 | −11 | 2 | D-11 | 9.39 | 100 | PGMAc | 88.61 | 100 | Scandex |
| Comparative Example 1 | −12 | 2 | HD-1 | 3.97 | 100 | PGMAc | 94.03 | 100 | Ultrasonic disperser |
| Comparative Example 2 | −13 | 2 | HD-2 | 4.00 | 100 | PGMAc | 94.00 | 100 | Homogenizer |
| Comparative Example 3 | −14 | 2 | HD-3 | 9.22 | 100 | PGMAc | 88.78 | 100 | Scandex |

*Amount of solution containing polymeric dispersant

Evaluation (1): Evaluation of CNT Dispersions

The viscosities of the CNT dispersions immediately after dispersion at 25° C. were measured using an E-type viscometer. In addition, the CNT dispersions were subjected to a centrifugal separation treatment. Then, the CNT concentrations of the CNT dispersions after the centrifugal separation were measured using a spectrophotometer and calculated. Note that a calibration curve made by measuring the absorbances of the samples the concentrations of which were known was used for the calculation of the CNT concentrations. Further, the degrees of dispersion stability (CNT concentration after centrifugal separation/CNT concentration when designed (%)) were calculated. In addition, the CNT dispersions after the centrifugal separation treatment were left to stand still for 7 days, and the states of the CNT dispersions after being left to stand still were visually checked. The results are shown in Table 6.

TABLE 6

Evaluation results for CNT dispersion

| | CNT dispersion | CNT concentration (%) when designed | Viscosity (mPa · s) immediately after dispersion | CNT concentration (%) immediately after centrifugal separation | Degree of dispersion stability (%) | State after being left to stand still for 7 days |
|---|---|---|---|---|---|---|
| Example 1 | −1 | 2 | 5.3 | 1.97 | 98.5 | No aggregates |
| Example 2 | −2 | 2 | 4.8 | 1.98 | 99.0 | No aggregates |
| Example 3 | −3 | 2 | 5.1 | 1.96 | 98.0 | No aggregates |
| Example 4 | −4 | 2 | 4.6 | 1.97 | 98.5 | No aggregates |
| Example 5 | −5 | 2 | 4.9 | 1.95 | 97.5 | No aggregates |
| Example 6 | −6 | 2 | 5.6 | 1.97 | 98.5 | No aggregates |
| Example 7 | −7 | 2 | 7.3 | 1.96 | 98.0 | No aggregates |
| Example 8 | −8 | 2 | 5.8 | 1.95 | 97.5 | No aggregates |
| Example 9 | −9 | 2 | 7.3 | 1.95 | 97.5 | No aggregates |
| Example 10 | −10 | 2 | 7.5 | 1.97 | 98.5 | No aggregates |
| Example 11 | −11 | 2 | 7.0 | 1.96 | 98.0 | No aggregates |
| Comparative Example 1 | −12 | 2 | 46.3 | 1.64 | 82.0 | Aggregates are present |
| Comparative Example 2 | −13 | 2 | 50.3 | 1.59 | 79.5 | Aggregates are present |
| Comparative Example 3 | −14 | 2 | 41.8 | 1.55 | 77.5 | Aggregates are present |

Production of Nanographene Dispersions

Example 12: NGR Dispersion-1

In a container made of a resin, 5.0 parts of nanographene (NGR) (average size: 5 μm, average thickness: 6 to 8 nm), 85.02 parts of PGMAc, and 9.98 parts of the solution (solid content: 50.1%) containing polymeric dispersant D-1 were placed. A stirring bar was placed in the container, and the mixture was stirred with a magnetic stirrer, and an ultrasonic disperser was used to apply ultrasonic waves (output 300 W) for 60 minutes to obtain NGR dispersion-1 which was a viscous liquid.

Examples 13 and 14, and Comparative Examples 4 and 5: NGR Dispersions-2 to 5

NGR dispersions-2 to 5 were obtained in the same manner as in Example 12 described above except that formulations shown in Table 7 were adopted and dispersion treatments were performed using dispersers shown in Table 7.

TABLE 7

Preparation of NGR dispersions

| | NGR | | | Polymeric dispersant | Solvent | | | |
|---|---|---|---|---|---|---|---|---|
| | NGR dispersion | Amount (parts) | Name | Parts* | Amount (parts) based on 100 parts of NGR | Type | Amount (parts) | Total (parts) | Disperser |
| Example 12 | -1 | 5 | D-1 | 9.98 | 100 | PGMAc | 85.02 | 100 | Ultrasonic disperser |
| Example 13 | -2 | 5 | D-6 | 6.00 | 60 | PGMAc | 89.00 | 100 | Scandex |
| Example 14 | -3 | 5 | D-11 | 18.78 | 80 | PGMAc | 76.22 | 100 | Homogenizer |
| Comparative Example 4 | -4 | 5 | HD-1 | 9.92 | 100 | PGMAc | 85.08 | 100 | Scandex |
| Comparative Example 5 | -5 | 5 | HD-3 | 23.04 | 100 | PGMAc | 71.96 | 100 | Ultrasonic disperser |

*Amount of solution containing polymeric dispersant

Evaluation (2): Evaluation of NGR Dispersions

The viscosities of the NGR dispersions at 25° C. were measured using an E-type viscometer. In addition, the median sizes ($D_{50}$) of the particles in the NGR dispersions were measured using a dynamic light scattering particle size distribution analyzer. Further, the particle size distributions of the particles in the NGR dispersions were measured using the dynamic light scattering particle size distribution analyzer to check whether the aggregates were present or not. The results are shown in Table 8.

TABLE 8

Evaluation results for NGR dispersions

| | NGR dispersion | NGR concentration (%) | Viscosity (mPa · s) | Median size (μm) | Aggregates |
|---|---|---|---|---|---|
| Example 12 | -1 | 5 | 42.3 | 4.5 | Absent |
| Example 13 | -2 | 5 | 45.7 | 4.7 | Absent |
| Example 14 | -3 | 5 | 44.6 | 4.6 | Absent |
| Comparative Example 4 | -4 | 5 | 103.2 | 10.3 | Present |
| Comparative Example 5 | -5 | 5 | 116.7 | 11.5 | Present |

Production of Carbon Nanofiber Dispersions

Example 15: CNF Dispersion-1

In a container made of a resin, 2.0 parts of a carbon nanofiber (CNF) (trade name "VGCF-H," manufactured by Showa Denko K.K., average diameter: 150 nm, average length: 6.0 μm), 94.01 parts of diethylene glycol diethyl ether (DEDG) (trade name "DEDG," manufactured by NIPPON NYUKAZAI CO., LTD.), 3.99 pars of the solution (solid content: 50.1%) containing polymeric dispersant D-1, and 150 parts of zirconia beads having a diameter of 0.5 mmϕ were placed. CNF was wetted with the organic solvent, but was in a state of being deposited at the bottom of the container keeping the original shape, and the supernatant solution was transparent. A dispersion treatment was performed for 60 minutes using an ultrasonic disperser. By the dispersion treatment with the ultrasonic disperser, the solution became uniformly black and turned into a state where the aggregated state of CNF was released. The solid matter not dispersed sufficiently was separated and removed by performing a centrifugal separation treatment for sedimentation to obtain CNF dispersion-1.

Examples 16 and 17, and Comparative Example 6: CNF Dispersions-2 to 4

CNF dispersions-2 to 4 were obtained in the same manner as in Example 15 described above except that formulations shown in Table 9 were adopted and that dispersion treatments were performed using dispersers shown in Table 9.

TABLE 9

Preparation of CNF dispersions

| | CNF | | Polymeric dispersant | | Solvent | | | |
|---|---|---|---|---|---|---|---|---|
| | CNF dispersion | Amount (parts) | Name | Amount* (parts) | Amount (parts) based on 100 parts of CNF | Type | Amount (parts) | Total (parts) | Disperser |
| Example 15 | -1 | 2 | D-1 | 3.99 | 100 | DEDG | 94.01 | 100 | Ultrasonic disperser |
| Example 16 | -2 | 2 | D-7 | 3.97 | 100 | DEDG | 94.03 | 100 | Homogenizer |
| Example 17 | -3 | 2 | D-9 | 9.30 | 100 | DEDG | 88.70 | 100 | Scandex |
| Comparative Example 6 | -4 | 2 | HD-2 | 4.00 | 100 | DEDG | 94.00 | 100 | Scandex |

*Amount of solution containing polymeric dispersant

Evaluation (3): Evaluation of CNF Dispersions

The viscosities of the CNF dispersions immediately after dispersion at 25° C. were measured using an E-type viscometer. In addition, the CNF dispersions were subjected to a centrifugal separation treatment. Then, the CNF concentrations of the CNF dispersions after the centrifugal separation were measured using a spectrophotometer and calculated. Note that a calibration curve made by measuring the absorbances of the samples the concentrations of which were known was used for the calculation of the CNF concentrations. Further, the degrees of dispersion stability (CNF concentration after centrifugal separation/CNF concentration when designed (%)) were calculated. In addition, the CNF dispersions after the centrifugal separation treatment were left to stand still for 7 days, and the states of the CNT dispersions after being left to stand still were visually checked. The results are shown in Table 10.

TABLE 10

Evaluation results for CNF dispersions

| | CNF dispersion | CNF concentration (%) when designed | Viscosity (mPa · s) immediately after dispersion | CNF concentration (%) after centrifugal separation | Degree of dispersion stability (%) | State after being left to stand still for 7 days |
|---|---|---|---|---|---|---|
| Example 15 | -1 | 2 | 5.3 | 1.9 | 95 | No aggregates |
| Example 16 | -2 | 2 | 4.8 | 1.91 | 95.5 | No aggregates |
| Example 17 | -3 | 2 | 5.1 | 1.94 | 97 | No aggregates |
| Comparative Example 6 | -4 | 2 | 46.3 | 1.33 | 66.5 | Aggregates are present |

Production of Carbon Black Dispersions

Example 18: CB Dispersion-1

In a container made of a resin, 20 parts of carbon black (CB) (trade name "#1000," manufactured by Mitsubishi Chemical Corporation), 68.02 parts of PGMAc, 11.98 parts of the solution (solid content: 50.1%) containing polymeric dispersant D-1, 1.0 part of synergist (copper phthalocyanine derivative, trade name "Solsperse 12000," manufactured by The Lubrizol Corporation), and 150 parts of zirconium beads having a diameter of 0.5 mm$ were placed. A dispersion treatment was performed for 30 minutes using an ultrasonic disperser to obtain CB dispersion-1.

Examples 19 and 20, and Comparative Example 7: CB Dispersions-2 to 4

CB dispersions-2 to 4 were obtained in the same manner as in Example 18 described above except that formulations shown in Table 11 were adopted and that dispersion treatments were performed using dispersers shown in Table 11.

TABLE 11

Preparation of CB dispersions

| | CB dispersion | CB Amount (parts) | Polymeric dispersant Name | Polymeric dispersant Amount* (parts) | Amount (parts) based on 100 parts of CB | Synergist Amount (parts) | Solvent Type | Solvent Amount (parts) | Total Parts | Disperser |
|---|---|---|---|---|---|---|---|---|---|---|
| Example 18 | -1 | 20 | D-1 | 11.98 | 30 | 1 | PGMAc | 68.02 | 100 | Ultrasonic disperser |
| Example 19 | -2 | 20 | D-3 | 11.95 | 30 | 1 | PGMAc | 68.05 | 100 | Homogenizer |
| Example 20 | -3 | 20 | D-8 | 11.95 | 30 | 1 | PGMAc | 68.05 | 100 | Scandex |
| Comparative Example 7 | -4 | 20 | HD-1 | 11.90 | 30 | 1 | PGMAc | 68.10 | 100 | Scandex |

*Amount of solution containing polymeric dispersant

Evaluation (4): Evaluation of CB Dispersions

The viscosities of the CB dispersions immediately after dispersion at 25° C. were measured using an E-type viscometer. In addition, the median sizes ($D_{50}$) of the particles in the CB dispersions were measured using a dynamic light scattering particle size distribution analyzer. Further, the viscosities at 25° C. of the CB dispersions after storage at 45° C. for 7 days were measured using the E-type viscometer. The results are shown in Table 12.

TABLE 12

Evaluation results for CB dispersions

| | CB dispersion | CB concentration (%) | Viscosity (mPa · s) immediately after dispersion | Median size (nm) | Viscosity (mPa · s) after storage at 45° C. for 7 days |
|---|---|---|---|---|---|
| Example 18 | -1 | 20 | 9.3 | 29.8 | 9.1 |
| Example 19 | -2 | 20 | 9.5 | 28.5 | 9.4 |
| Example 20 | -3 | 20 | 9.2 | 27.9 | 9.2 |
| Comparative Example 7 | -4 | 20 | 53.1 | 54.7 | 78.1 |

Production and Evaluation of CNT-dispersed Ink Coating Films

Application Example 1

To CNT dispersion-1 obtained in Example 1, an acrylic resin solution (benzyl methacrylate/methacrylic acid copolymer, Mn: 7,500, acid value: 100 mgKOH/g, PGMAc solution, solid content: 40%) was added in an amount such that the amount of the acrylic resin based on 100 parts of CNT was 100 parts. The resultant mixture was diluted by adding PGMAc such that the CNT concentration was 1% to obtain CNT-dispersed ink-1. A surface of a PET film having a thickness of 100 μm was coated with the obtained ink using a bar coater such that the average film thickness was μm and was then dried at 130° C. for 30 minutes to form an electrically conductive coating film. The surface resistance value of the coating film was measured using a resistivity meter (trade name "Hiresta," manufactured by Nittoseiko Analytech Co., Ltd.). The result is shown in Table 13.

Application Examples 2 to 4 and Comparative Application Example 1

CNT-dispersed inks-2 to 5 were respectively prepared in the same manner as in Application Example 1 described above except that CNT dispersions of the types shown in Table 13 were used. Then, electrically conductive coating films were formed using the prepared CNT-dispersed inks respectively in the same manner as in Application Example 1 described above to measure the surface resistance values. The results are shown in Table 13.

TABLE 13

Properties of CNT-dispersed ink coating films

| | CNT-dispersed ink | CNT dispersion | Amount (parts) of acrylic resin based on 100 parts of CNT | Amount (%) of CNT in ink | Average film thickness (μm) | Surface resistivity (Ω/□) |
|---|---|---|---|---|---|---|
| Application Example 1 | -1 | -1 | 100 | 1 | 5 | $1.2 \times 10^{10}$ |
| Application Example 2 | -2 | -5 | 100 | 1 | 5 | $1.5 \times 10^{10}$ |
| Application Example 3 | -3 | -10 | 100 | 1 | 5 | $1.1 \times 10^{10}$ |
| Application Example 4 | -4 | -11 | 100 | 1 | 5 | $1.3 \times 10^{10}$ |
| Comparative Application Example 1 | -5 | -13 | 100 | 1 | 5 | $5.6 \times 10^{12}$ |

Production of NGR-Dispersed Ink Coating Films

Application Example 6

To NGR dispersion-1 obtained in Example 12, an acrylic resin solution (benzyl methacrylate/methacrylic acid copolymer, Mn: 7,500, acid value: 100 mgKOH/g, PGMAc solution, solid content: 40%) was added in an amount such that the amount of the acrylic resin based on 100 parts of NGR was 100 parts. The resultant mixture was diluted by adding PGMAc such that the NGR concentration was 3% to obtain NGR-dispersed ink-1. A surface of a PET film having a thickness of 100 μm was coated with the obtained ink using a bar coater such that the average film thickness was m and was then dried at 130° C. for 30 minutes to form an electrically conductive coating film. The surface resistance value of the coating film was measured using a resistivity meter (trade name "Hiresta," manufactured by Nittoseiko Analytech Co., Ltd.). The result is shown in Table 14.

Application Examples 7 and 8, and Comparative Application Example 2

NGR-dispersed inks-2 to 4 were respectively prepared in the same manner as in Application Example 6 described above except that NGR dispersions of the types shown in Table 14 were used. Then, electrically conductive coating films were formed using the prepared NGR-dispersed inks respectively in the same manner as in Application Example 6 described above to measure the surface resistance values. The results are shown in Table 14.

TABLE 14

Properties of NGR-dispersed ink coating films

| | NGR-dispersed ink | NGR dispersion | Amount (parts) of acrylic resin based on 100 parts of NGR | Amount (%) of NGR in ink | Average film thickness (μm) | Surface resistivity (Ω/□) |
|---|---|---|---|---|---|---|
| Application Example 6 | -1 | -1 | 100 | 3 | 5 | $3.59 \times 10^{6}$ |
| Application Example 7 | -2 | -2 | 100 | 3 | 5 | $3.83 \times 10^{6}$ |
| Application Example 8 | -3 | -3 | 100 | 3 | 5 | $3.41 \times 10^{6}$ |
| Comparative Application Example 2 | -4 | -4 | 100 | 3 | 5 | $9.47 \times 10^{10}$ |

Kneading of CNF into Resin

Application Example 9

In a beaker, 3,000 parts of a solvent (methanol/water=1/1) was placed. CNF dispersion-1 obtained in Example 15 was gradually put therein under stirring with a disper to deposit CNF (resin-covered CNF) covered with the polymeric dispersant. The deposited resin-covered CNF was subjected to filtration and then washed with methanol and water. After drying with a dryer, resin-covered CNF (solid content 99.5%) was obtained.

A rubber-modified polystyrene resin and the resin-coated CNF in an amount of 2 parts based on 100 parts of the rubber-modified polystyrene resin were mixed. The resultant mixture was extrusion-shaped using Labo Plastomill (manufactured by Toyo Seiki Seisaku-sho, Ltd.) equipped with a T-die to produce a sheet-like sample for evaluation having a thickness of about 0.5 mm and a width of 100 mm. The produced sample for evaluation was pressed to prepare a sheet having a thickness of about 20 μm. The prepared sheet was observed with an optical microscope to find that aggregates of CNF were not recognized. Further, the surface resistance value of the prepared sheet was measured to find to be $5.26 \times 10^8 \Omega/$.

Comparative Application Example 3

A sheet-like sample for evaluation was produced in the same manner as in Application Example 9 described above except that CNF dispersion-4 obtained in Comparative Example 6 was used in place of CNF dispersion-1. Further, the produced sample for evaluation was pressed to prepare a sheet having a thickness of about 20 μm. The prepared sheet was observed with an optical microscope and it was recognized that a large number of aggregates of CNF were present. Further, the surface resistance value of the prepared sheet was measured and find to be $8.38 \times 10^{10} \Omega/$.

INDUSTRIAL APPLICABILITY

The carbon material dispersion of the present invention is useful as a material for producing various products, such as paints, inks, plastic products, and in addition, battery materials, electronic component trays, covers for IC chips, electromagnetic wave shields, automobile members, and robot parts.

The invention claimed is:
1. A carbon material dispersion comprising
at least one carbon material selected from the group consisting of carbon black, a carbon fiber, a carbon nanotube, graphite, and graphene;
an organic solvent; and
a polymeric dispersant,
wherein the polymeric dispersant is a polymer having:
3 to 55% by mass of a constituent unit (1) represented by the following formula (1),
45 to 90% by mass of a constituent unit (3) represented by the following formula (3), and
0.5 to 20% by mass of a constituent unit (4) connecting units comprising the constituent unit (1) and the constituent unit (3), relative to a total amount of all constituent units of the polymer as 100% by mass,
the polymeric dispersant has an amine value in a range of 100 mg KOH/g or less and a number average molecular weight in a range from 5,000 to 20,000, and a monomer (4) forming the constituent unit (4) is at least one monomer selected from the group consisting of (meth)acrylic acid-based monomers and vinyl monomers:

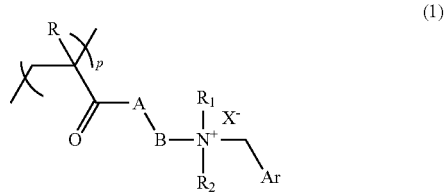

wherein R represents a hydrogen atom or a methyl group, A represents O or NH, B represents an ethylene group or a propylene group, $R_1$ and $R_2$ each independently represent a methyl group or an ethyl group, Ar represents a phenyl group, a naphthyl group, an anthracenyl group, or a pyrenyl group, X represents a chlorine atom, a bromine atom, bis(trifluoromethyl)sulfonimide, or bis(nonafluorobutanesulfonyl)imide, and p represents an arbitrary number of repetition,
wherein a monomer (1) forming the constituent unit (1) and a monomer (3) forming the constituent unit (3) each have a double bond so as to polymerize and form the constituent unit (1) and the constituent unit (3), respectively; and

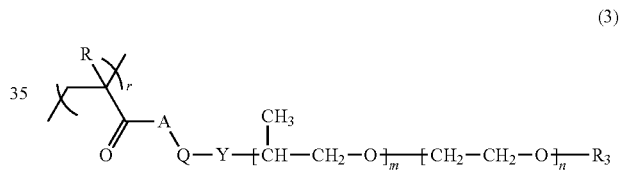

wherein R represents a hydrogen atom or a methyl group, A represents O or NH, Q represents an ethylene group or a methylethylene group, Y represents O, NHCOO, or NHCONH, m and n each independently represent an average number of repeating units of 0 or more and satisfy m+n=20 to 100, $R_3$ represents a C1-18 alkyl group, aryl group, or alkylaryl group, and r represents an arbitrary number of repetition.

2. The carbon material dispersion according to claim 1, wherein the polymeric dispersant is the polymer further having a constituent unit (2) represented by the following formula (2):

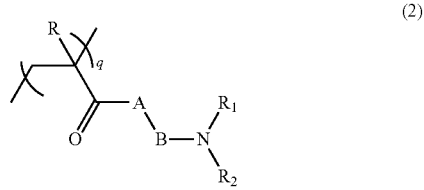

wherein R represents a hydrogen atom or a methyl group, A represents O or NH, B represents an ethylene group or a propylene group, $R_1$ and $R_2$ each independently represent a methyl group or an ethyl group, and q represents an arbitrary number of repetition, and a monomer (2) forming the constituent unit (2) has a double bond so as to polymerize and form the constituent unit (2).

3. The carbon material dispersion according to claim 2, wherein
the constituent unit (1), the constituent unit (2), and the constituent unit (3) are represented by the following formula (1-1), the following formula (2-1), and the following formula (3-1), respectively, and
the constituent unit (4) comprises a constituent unit derived from α-methylstyrene:

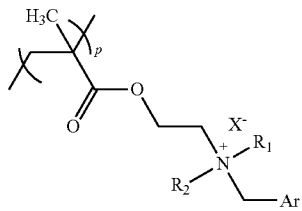

(1-1)

wherein $R_1$ and $R_2$ each independently represent a methyl group or an ethyl group, Ar represents a phenyl group, a naphthyl group, an anthracenyl group, or a pyrenyl group, X represents a chlorine atom, a bromine atom, bis(trifluoromethyl) sulfonimide, or bis(nonafluorobutanesulfonyl)imide, and p represents an arbitrary number of repetition;

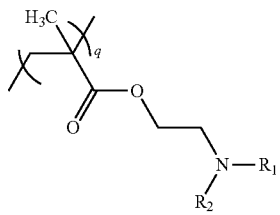

(2-1)

wherein $R_1$ and $R_2$ each independently represent a methyl group or an ethyl group, and q represents an arbitrary number of repetition; and

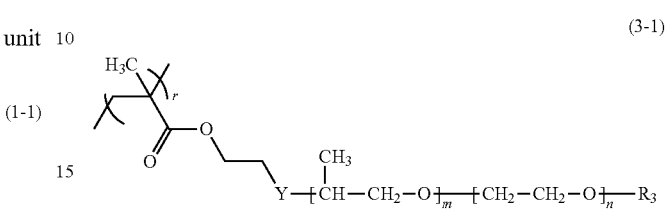

(3-1)

wherein Y represents NHCOO or NHCONH, m and n each independently represent an average number of repeating units of 0 or more and satisfy m+n=20 to 100, $R_3$ represents a C1-18 alkyl group, aryl group, or alkylaryl group, and r represents an arbitrary number of repetition.

4. The carbon material dispersion according to claim 1, wherein
a content of the carbon material is 15% by mass or less, and
a content of the polymeric dispersant based on 100 parts by mass of the carbon material is 10 to 200 parts by mass.

5. The carbon material dispersion according to claim 1, wherein the monomer (4) comprises at least one monomer selected from the group consisting of (meth)acrylic acid, (meth)acrylic acid ester, styrene, vinyltoluene, vinylpyridine, vinylcaprolactone, vinylimidazole, α-methylstyrene, and vinyl acetate.

* * * * *